Dec. 1, 1931.  H. UMESAKI  1,834,010
AEROPLANE CONTROL
Filed Jan. 20, 1931   2 Sheets-Sheet 1

Inventor
Hachitaro Umesaki

By Clarence A. O'Brien
Attorney

Dec. 1, 1931.   H. UMESAKI   1,834,010
AEROPLANE CONTROL
Filed Jan. 20, 1931   2 Sheets-Sheet 2
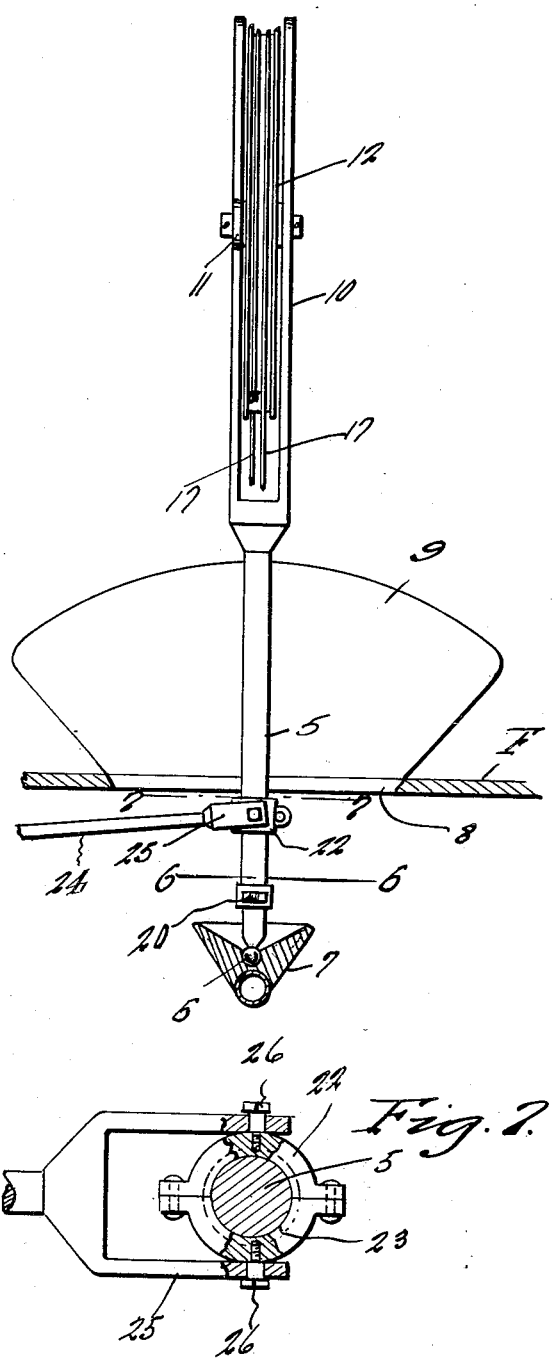
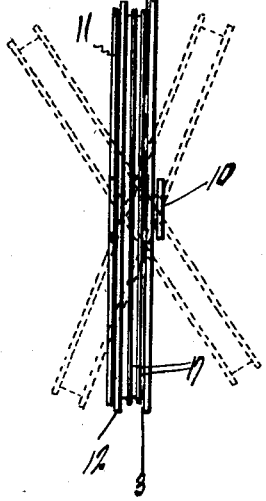
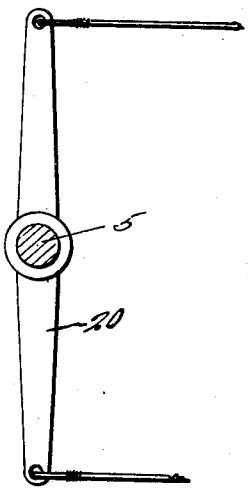
Inventor
Hachitaro Umesaki
By Clarence A. O'Brien
Attorney Patented Dec. 1, 1931

1,834,010

UNITED STATES PATENT OFFICE

HACHITARO UMESAKI, OF CHICAGO, ILLINOIS

AEROPLANE CONTROL

Application filed January 20, 1931. Serial No. 509,998.

This invention relates to certain new and useful improvements in aeroplane controls, and the primary object of this invention is to provide a control which will consist of less parts and will be comparatively more simple than controls now used on such crafts.

The most important object of the invention is to provide a single stick and means associated therewith and having operative connection with the elevator, rudder, and ailerons respectively whereby each of these parts of the air craft may be controlled with facility.

Other objects and advantages of the invention will become apparent during a study of the following description, taken in connection with the accompanying drawings wherein:

Figure 4 is a view taken at substantially right angles to Figure 2.

Figure 5 is a side elevational view of a wheel forming part of the invention.

Figure 1:
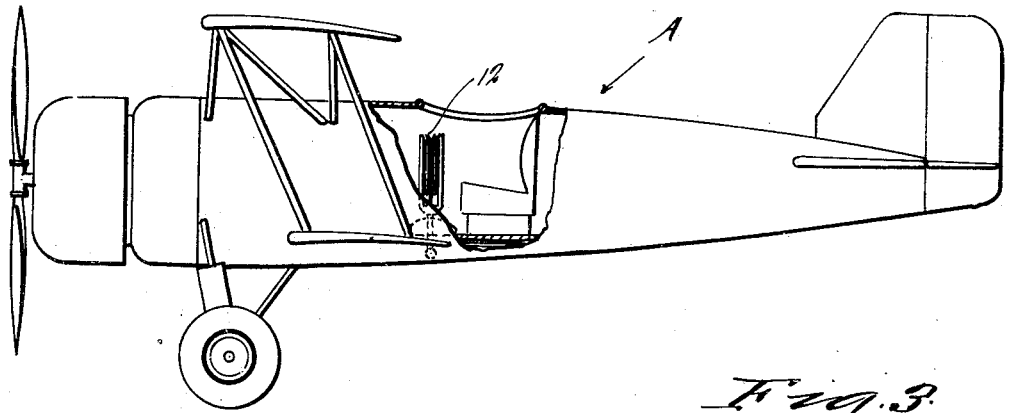
Figure 1 is a side elevational view of an aircraft, certain parts being broken away to show the application of the invention therewith.

Figures 6 and 7 are transverse sectional views taken substantially on the lines 6—6 and 7—7 respectively of Figure 4.

Referring more in detail to the drawings it will be seen that I have shown a conventional type of aeroplane, the same being designated generally by the reference character A and including a fuselage frame structure S and a floor for the fuselage designated generally by the reference character F.

Figure 2:
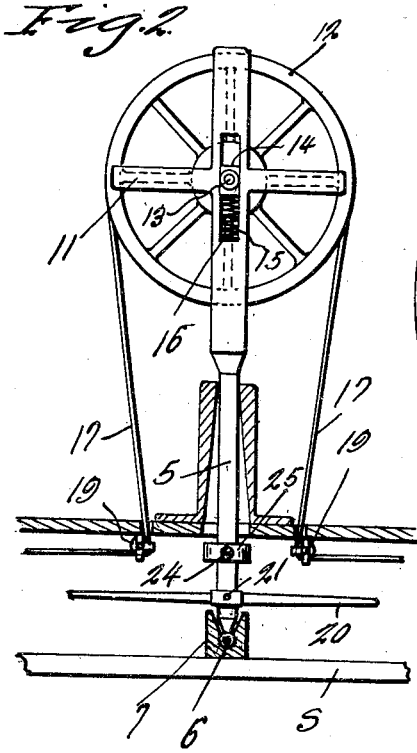
Figure 2 is a fragmentary elevational sectional view of the control.
Figure 3:
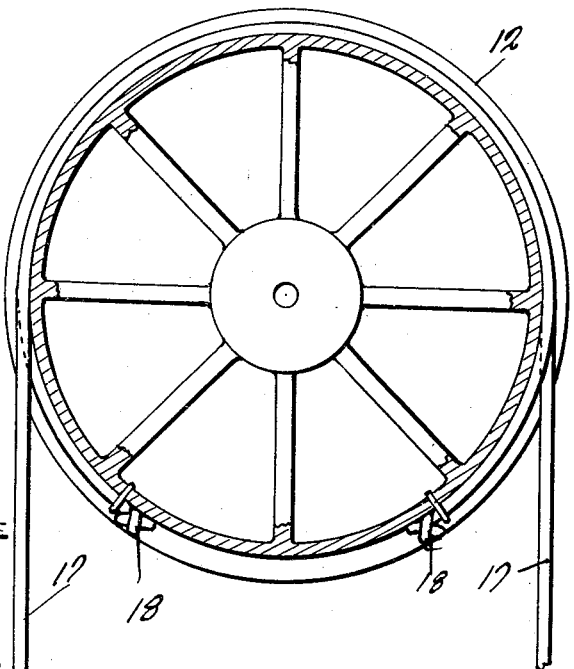
Figure 3 is a transverse sectional view taken substantially on the line 3—3 of Figure 5.

The improved control device consists of a stick or rod 5 that at its lower end is tapered and at said end is equipped with a ball 6 fitting within a suitable pocket provided in a dish out bearing 7 provided on the frame structure F of the fuselage. The stick 5 extends upwardly through a slot 8 provided in the floor F and is constrained for rocking movement right and left in Figure 4, that is fore and aft of the aeroplane A, between a pair of guide plates 9 rising from the floor F on opposite sides of the slot 8. Preferably the oppositely disposed plates 9 are wedge shaped in cross section as suggested in Figure 2, the opposed faces of the plates converging toward one another at the upper portion of the plates.

The plates 9 have their upper edges curved, and the rod or stick 5 at its upper portion is enlarged, and bifurcated to provide a pair of relatively spaced parallel extensions 10. Preferably each of the extensions 10 intermediate its end, is provided with a cross bar 11.

A flange pulley wheel 12 is rotatably mounted between the extensions 10, the shaft 13 of the pulley wheel being journalled in bearings 14 slidable in slots 15 provided in the extensions 10. Bearings 14 are normally urged upwardly with respect to the slots through the medium of suitable spring means 16.

Rudder control cables 17—17 are trained over the wheel 12, and at one end are anchored to the wheel as at 18. Rudder control cables are then cast downwardly and are trained over suitable guide pulleys 19 (see Figure 2) and the ends of the cable are suitably connected to the rudder control bar (not shown).

Obviously by rotating wheel 12 in the proper direction the rudder will be swung to the right or left for steering the airship.

A cross bar 20 for controlling the ailerons is keyed intermediate its ends as at 21 to the lower portion of the rod or stick 5. Obviously by rotating the rod 5 on a vertical axis for swinging the cross rod 20, the same which is suitably connected, by means not shown, to the ailerons, will manipulate the ailerons as desired.

Above the cross rod 20 there is clamped about the rod 5 a two part collar 22. The complemental parts of the collar 22 are internally grooved, and the rod 5 is provided with a peripheral flange receivable in the groove as suggested at 23 in Figure 7.

An elevator control rod 24 at one end is suitably and operatively connected by means (not shown) with the elevator of the aircraft. At its other end bar 24 is provided with an integral fork 25 the ends of which are pivotally connected with the collar 22 through the medium of pivot pins 26. The oppositely disposed pins 26 threadedly engage the parts of the collar 22 as shown in Figure 7.

Collar 22 is thus mounted on rod 5 and it is apparent that rod 5 may be located on a vertical axis relative to the elevator control rod 24. It will be also apparent, that by swinging the rod 5 to the right or left in Figure 5, fore or aft with respect to the aeroplane A, bar 24 will be suitably operated for actuating the elevators of the aircraft.

From the foregoing then it will be seen that according to the present invention, the rudder, elevators and ailerons of the aircraft may be readily and easily controlled, and that the control device as herein disclosed, eliminates the use of separate and independent control elements for these parts of the aircraft.

An aircraft equipped with a control device comprehended by the present invention will be found especially useful in making student flights, and also for experienced pilots when making long trips, since obviously the control may be readily manipulated by the hands of the pilot thus obviating the need of bringing the feet into use as is required with control devices as used in present day aircraft.

Even though I have herein shown and described the preferred embodiment of the invention, it is to be understood that the same is susceptible to changes, modifications and improvements coming within the scope of the appended claims.

Having thus described my invention, what I claim as new is:

1. In a control device of the character described, the combination of a control stick capable of movement in two directions and having a pair of opposed slotted portions, a control wheel rotatably supported between said slotted portions, and a sliding bearing in the slot of each of said portions and receiving one end of the axle of said control wheel.

2. In a control device of the character described, the combination of a control stick capable of movement in two directions and having a pair of opposed slotted portions, a control wheel rotatably supported between said slotted portions, and a sliding bearing in the slot of each of said portions and receiving one end of the axle of said control wheel, and yieldable devices arranged in said slots bearing against said sliding bearings for normally urging the latter in a given direction.

3. In a controlling device of the character described, the combination of a control stick capable of movement in two or more directions, said stick being bifurcated adjacent one end thereoef and at said bifurcated end having opposed portions longitudinally slotted, a wheel rotatably supported between said opposed portions in said furcation and provided with an axle, and a bearing slidably accommodated in each of said slots and receiving one end of said axle, and yieldable means normally urging said bearings in one direction.

4. In a control device of the character described, the combination of a control stick provided at one end with a ball, a fixed socket receiving said ball, a pair of opposed guide members located in a plane above the plane of said socket and receiving therebetween said control stick for limiting movement of the stick about a transverse axis to two directions, each of said opposed guide members having a convex upper edge, the opposed faces of said guide members being inclined at an incline to the perpendicular to converge toward one another at the upper edges of said guide members.

In testimony whereoef I affix my signature.
HACHITARO UMESAKI.